PUNCH AND TAPE FEED VERIFYING APPARATUS

Filed Sept. 11, 1961 3 Sheets-Sheet 1

INVENTORS
JOHN H. MACNEILL,
JAMES E. BELLINGER, Jr.
& STANLEY D. BLOEMENDAAL
BY
Hurvitz & Rose
ATTORNEYS INVENTORS
JOHN H. MACNEILL,
JAMES E. BELLINGER, Jr.
& STANLEY D. BLOEMENDAAL
BY Hurvitz & Rose
ATTORNEYS INVENTORS
JOHN H. MACNEILL,
JAMES E. BELLINGER, Jr.
& STANLEY D. BLOEMENDAAL
BY Hurvitz & Rose
ATTORNEYS 3,159,337
Patented Dec. 1, 1964

3,159,337

PUNCH AND TAPE FEED VERIFYING APPARATUS

John H. MacNeill, Indialantic, James E. Bellinger, Jr., Eau Gallie, and Stanley D. Bloemendaal, Melbourne, Fla., assignors to Soroban Engineering, Inc., Melbourne, Fla., a corporation of Florida Filed Sept. 11, 1961, Ser. No. 137,085
11 Claims. (Cl. 234—33)

The present invention relates to verification apparatus and more particularly to apparatus employed with punching mechanisms for verifying the proper operation of the individual punch members and for verifying advance of the record member immediately after each punching operation.

The verification apparatus of the present invention is described as utilized with a specific punching mechanism for perforating continuous paper, plastic, and/or metallic tapes. It is to be understood, however, that the verification mechanism is not limited to utilization with a specific continuous tape mechanism or even to a mechanism which is adapted to operate upon continuous tapes. The mechanism has equal utility in verification of the functioning of a card and related types of punching apparatus.

The apparatus of the present invention verifies two distinct functions of the punch mechanism. The first function relates to the advance of the record member immediately after each perforation thereof and the second feature relates to verification of the pattern of punches operated in response to input signals to the apparatus; the signals designating the particular punch members which are to be actuated. With respect to the first feature, it is conventional in punch mechanisms to provide a vacuum chad disposal system. Chad is the material removed from the record member in response to operation of the punching mechanism. The punch pins carry this material into a temporary collection chamber, and it is removed therefrom by a vacuum pumping system. The chad is carried by the vacuum system through a chad-collector or separator which separates the chad from the air flow, the air flow then continuing to the pump. The chad is periodically removed from the collector.

In accordance with a first feature of the present invention, the vacuum system provided for chad removal is further employed as a source of air flow in a hot wire anemometer system. A hot wire anemometer is an element connected in an electrical circuit and adapted to be heated by current flow therethrough to a predetermined temperature. Movement of air over the anemometer changes the temperature of the element and varies its resistance. This change in resistance may be detected as an indication of air flow or lack of it relative to the hot wire element. In the present invention, the vacuum system employed for chad removal is provided with additional passages to provide a flow of air, generally perpendicular to the plane of the record member, through a region of the record member having equally spaced holes therein. For instance, in a paper tape record member, equally spaced sprocket holes are provided along the length of the tape, these holes being engaged by sprocket teeth for tape advance. The extension of the vacuum system for chad removal causes air to flow across a region of the tape in which the feed holes normally appear. If a tape is advanced, then a web of material between the feed holes may temporarily block the flow of air during movement of the tape and permit the air flow to be reinstituted when tape advance is completed.

Conversely, the flow of air may be directed at a web portion of the tape when the tape is stationary so that normally the flow of air through this portion of the system is blocked. During tape advance, air is permitted to flow temporarily when the feed hole becomes disposed in the path of air flow. In either case, there is a variation in air flow through the extension of the chad disposal vacuum system which variation in flow is directed over the hot wire element. Therefore, the variations in resistance of the hot wire element may be employed to detect the movement of the tape. It is not intended to limit the invention to utilization with record tapes since many types of record members may be provided with equally spaced holes disposed along the direction of movement of the member, which holes may be sensed by the hot wire apparatus of the invention. It is to be understood that in the absence of a chad removal system in association with a punch, a vacuum system may be added to a punch apparatus for use only with the tape advance detection elements.

In accordance with another aspect of the present invention, as indicated above, there is provided a mechanism for sensing the movement of the punching members. Again referring to a paper tape punch, for purposes of explanation, the punch may be provided with five, six, seven or eight selectively operable punch pins, the individual operations of which are selected in accordance with an incoming code. In accordance with the present invention, one side of each of the punch pins is provided with two recesses, one of which is deeper than the other. In the unactuated position of the pin the deeper recess is disposed opposite the pole piece of a variable reluctance pick-up device. The variable reluctance device comprises a permanent magnet and a magnetic path which is completed through the punch pin. A coil is disposed about a pole piece of the magnetic system and the flux linking the coil is a function of the reluctance of the path. When the punch pin is moved into a punching position, the less deeply recessed portion of the punch pin is disposed adjacent the pole piece of the magnetic system, thereby reducing the magnetic reluctance of the system and varying the field linking the coil. Obviously, the positions of the two recesses may be interchanged or only a single recess may be employed although two recesses are preferable since a larger signal is produced. The change in the field linking the coil induces a voltage therein and the polarity of the voltage is a function of whether this field is increasing or decreasing. Upon each actuation of a particular pin, its associated coil produces a voltage first of one and then of the other polarity as the magnetic reluctance of the path is decreased when the pin is actuated and is increased when the pin is returned to its unactuated position. A similar detection system is provided for each punch pin and a pattern of voltages is developed on a group of output leads, one of which is associated with each detection device, indicative of the pattern of actuated punches. If the apparatus has functioned properly, the pattern of voltages produced corresponds with the pattern of applied signals. A verification circuit may be employed to determine correspondence between the two sets of signals.

The verification of operation obtained by sensing the movement of the pins does not provide a complete verification of operation. If the record member has not moved, then one code is punched over a previous code and the final pattern of perforations in the record member has no meaning whatsoever. Therefore, it is preferable to utilize the signals from both the punch verification apparatus and the tape advance verification apparatus in order that a signal or indication of correct operation occurs only if both of the signals; that is, both the film advance signal and the set of signals from the punch detection apparatus, are correct. In a specific system, the punch mechanism may be held inoperative if the preceding punch cycle was not correct. In such a system, it may be useful to employ the signal derived from the tape advance verifier as a gating signal for gating the voltages developed by the variable reluctance pick-ups to a verification apparatus and only permit new signals to feed to the punch coding circuitry if the punch verification apparatus produces the proper coded voltages. Of course, other systems of combining the tape advance and punch verification signals may be employed, the above example being provided for purposes of explanation only.

It is an object of the present invention to provide a punching mechanism with an apparatus for detecting the proper operation of individual punch members in response to command signals applied to the punch device.

It is another object of the present invention to provide a simple punch verification apparatus which produces readily interpreted output signals in response to operation of the various individual punch members.

Still another object of the present invention is to provide an apparatus for use with a punching mechanism for verifying advance of the record member after each or immediately preceding each punch operation.

It is yet another object of the present invention to provide a hot wire anemometer circuit for determining advance of a perforated record member.

Still another object of the present invention is to provide a hot wire anemometer circuit for determining advance of a record member, air flow over the anemometer being derived from the chad removal system associated with the punching mechanism, if any.

It is yet another object of the present invention to provide apparatus for verifying correct operation of both the record punching apparatus and the record member advance mechanism of a punch device.

It is still another object of the present invention to provide apparatus for verifying correct operation of both the record punching apparatus and the record member advance mechanism of a punch device and for preventing further operation of the punch if either operation has not been carried out properly.

The above and still further objects, features and advantages of the present invention will become apparent upon consideration of the following detailed description of one specific embodiment thereof, especially when taken in conjunction with the accompanying drawings, wherein.

Figures 1, 2:
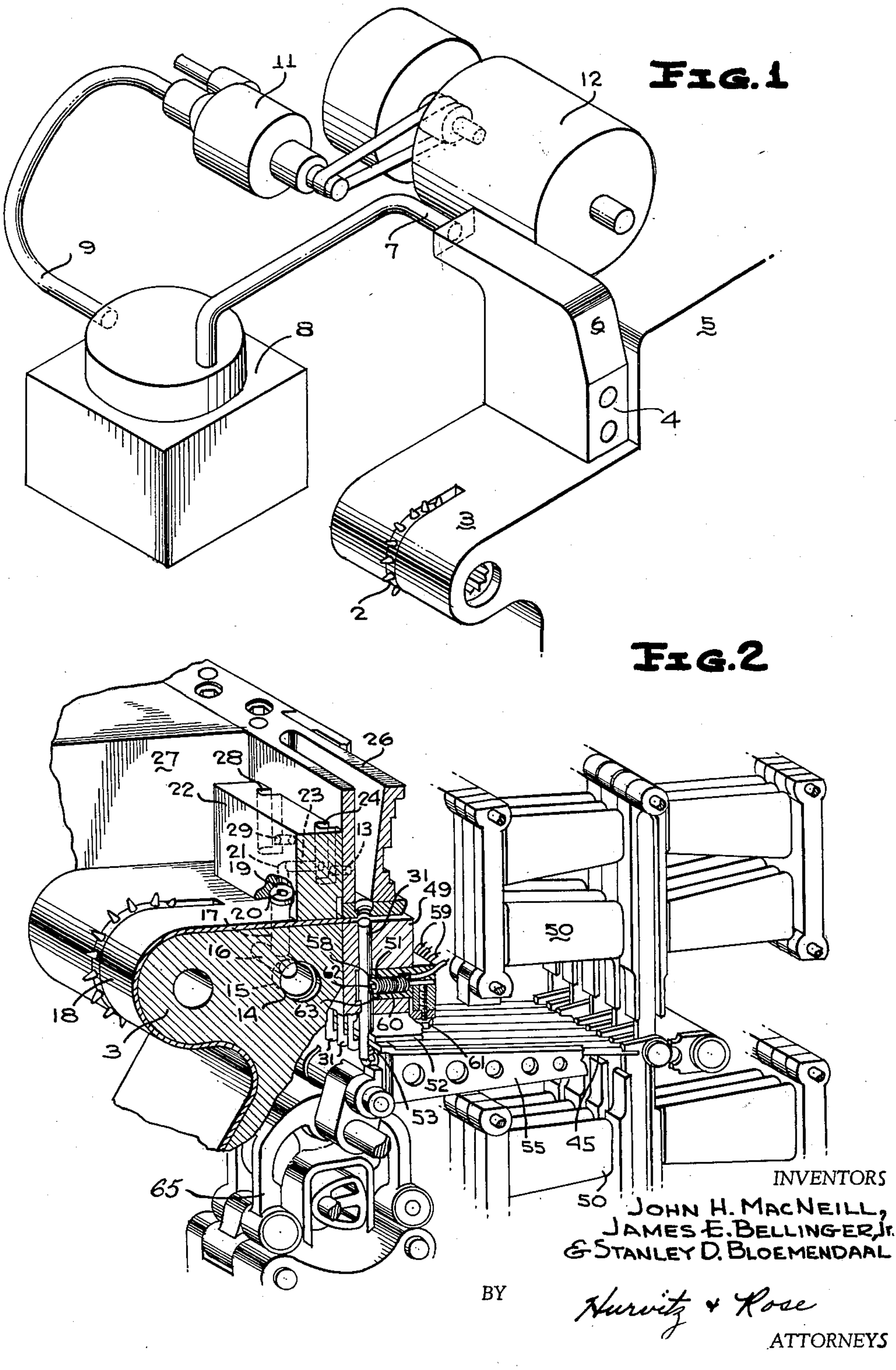
FIGURE 1 is a perspective view in elevation of a chad removal system in which the present invention may be incorporated.
FIGURE 2 is a perspective view in elevation of a punch apparatus having both of the verification apparatus applied thereto.

Referring now specifically to FIGURE 1 of the accompanying drawings, there is illustrated a punch device and the chad removal system associated therewith. For purposes of explanation, the mechanisms of the present invention are illustrated as embodied in an ultra-high speed punch as disclosed and claimed in U.S. Patent No. 2,962,208 issued to John H. MacNeill et al. on November 29, 1960. In FIGURE 1 of the accompanying drawings, only the barest outlines of the punch are illustrated and the elements displayed comprise a drive sprocket 2, a housing 3 for the drive sprocket, a chad compartment and die plate carrier 4, all supported on a housing generally represented by the reference numeral 5. The chad removal compartment 4 is provided with a manifold-like hollow member 6 which communicates at its lower end with the interior of the chad removal compartment 4 and communicates at its upper end with a chad air tube 7. The tube 7 enters the top of a hollow chad collector 8, and air is withdrawn therefrom through a tube 9 connected to the suction side of a pump 11. The pump 11 is driven by a motor 12 which also supplies power to the punch mechanism.

In operation of the chad removal system, air is drawn into the chad compartment 4 through a vent or hole 13 in the left-hand wall thereof, as viewed in FIGURE 1, picks up the chad and carries it, due to suction provided by the pump 11, through the tube 7 into the chad collector 8. At this point, the sudden expansion of the flow path greatly reduces air velocity and allows the chad to fall to the bottom of the collector. The air is then withdrawn back through the tube 9 to the vacuum pump 11.

Figures 3, 4, 5, 6:
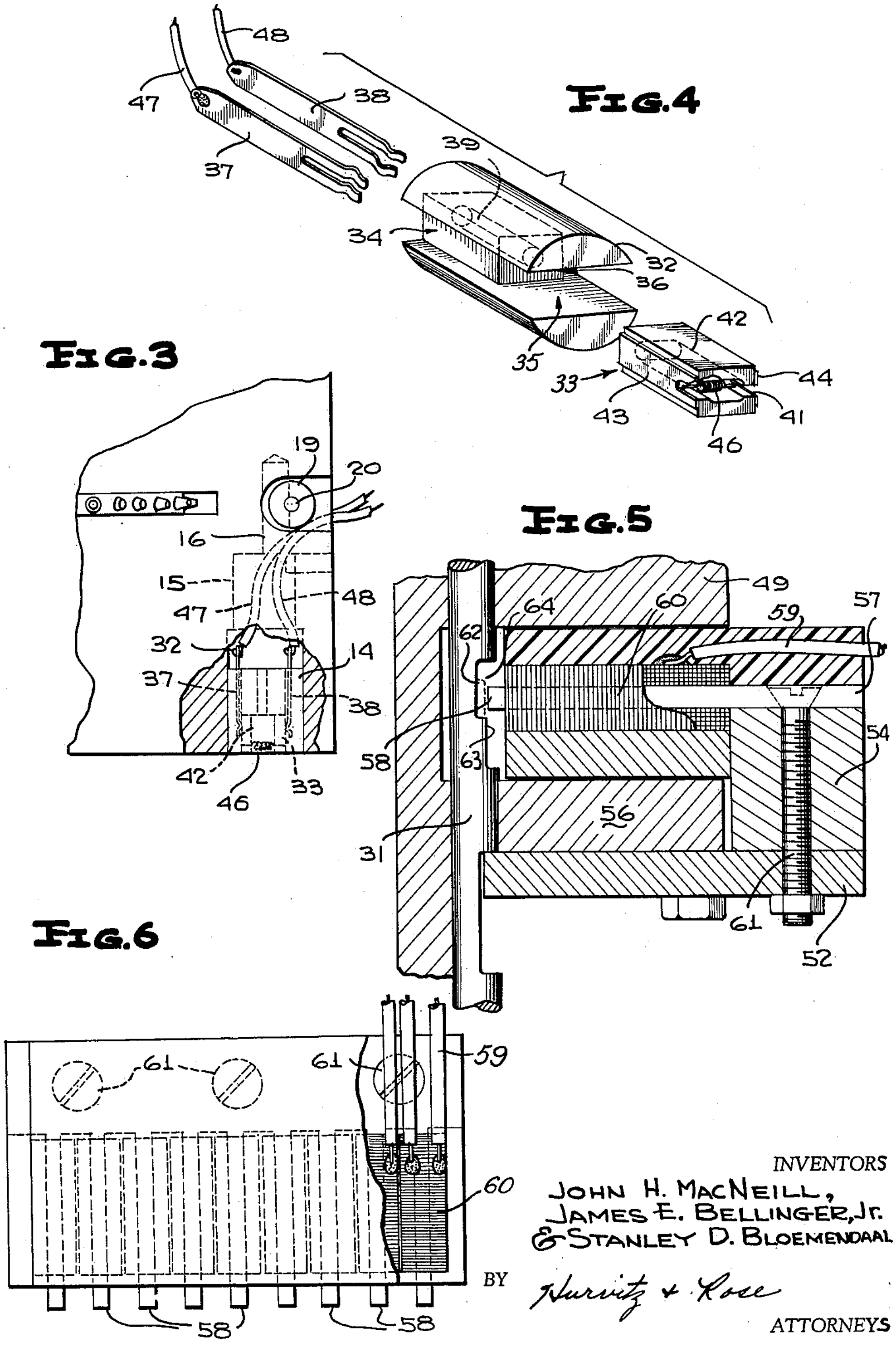
FIGURE 3 is a top view partially in section of the tape feed sensing mechanism.
FIGURE 4 is an exploded view in perspective of the air flow sensing device.
FIGURE 5 is a sectional view in elevation illustrating a portion of the punch pin actuation sensing mechanism.
FIGURE 6 is a top view of the variable reluctance mechanism for sensing punch pin operation.

Referring now specifically to FIGURES 2 and 3 of the accompanying drawings, there is illustrated the mechanism of the present invention as applied to a punch device as illustrated in the aforesaid U.S. patent. A cylindrical hole 14 is drilled into the front of the block 3, as illustrated in FIGURE 2, this hole being adapted to receive, as indicated subsequently, the anemometer element. The cylindrical hole 14 communicates with a further cylindrical hole 15 (see FIGURE 3) of slightly reduced diameter which is generally coaxial with the hole 14. The hole 15 communicates via a passage 16 with a generally vertically extending passage 17 that extends through the top of the block 3. The block 3 is covered by a sheet metal member 18 and a sleeve 19 extends through an aperture in the sheet metal member 18 into the block 3. The sleeve 19 is centrally bored at 20 and is employed to provide a seal at this point between the sheet metal plate 13 and the block 3 so as to prevent leakage between these two elements. The central aperture 20 of the sleeve 19 communicates with the passage 17 and with a generally vertical passage 21 in a solid block 22. A horizontally extending passage 23 in the block 22 communicates at one end with the passage 21 and at the other end with a vertical recess 24 in the face of the block 22 adjacent the chad disposal compartment 26. The block 22 may be secured to the left surface of the chad compartment 26 at the top of the block 3 or a wall 27 of the punch, whichever is most suitable. The vertical groove or indentation 24 in the right surface of the block 22 communicates with the aperture 13 in the left wall of the chad compartment 26 to complete the air flow passage to this portion of the apparatus. The block 22 is preferably, although not necessarily, provided with a further groove 28 in the right surface thereof which communicates with a passage 29 into the chad compartment 26.

Upon actuation of the motor 12 and therefore the pump 11, air is drawn through the grooves 24 and 28 and into the chad compartment 26 and thence through the path traced in the description of FIGURE 1. In the system as illustrated in FIGURE 2, air is also drawn through the series of passages comprising the bores 14, 15, 16, 17, 20 and the passages 21 and 23 into the groove 24. Thus, it is seen that by the addition of the block 22 and additional bores in the block 3, air is caused to flow through the cylindrical bore 14.

The central aperture 20 in the sleeve 19 may have one of two different positions relative to the punching members or specifically a plurality of punch pins 31, depending upon the type of external circuitry employed. If it is wished to have the bore 20 uncovered when the tape is at rest, then the bore is displaced from the pins 31, along the direction of travel of the tape, by a distance equal to the displacement between two adjacent feed holes or multiples thereof. When the tape is at rest, the bore 19 is unblocked and air flows through the aperture 14. On the other hand, if the system is such that it is desired to have the hole 19 blocked when the tape is at rest and have it unblocked only for a short interval during transport of the tape, then the hole 19 is displaced relative to the pins such that, when the tape is at rest, a web portion of the tape, located between two feed holes, is dispoed over the central bore 20. In either event, it is seen that movement of the tape will cause a considerable change in the flow of air through the bore 14 upon transport of the tape.

Referring now specifically to FIGURES 3 and 4 of the accompanying drawings, the latter of which is an exploded view of the hot wire anemometer apparatus, there is provided a module receptacle 32 for receiving a hot wire module 33. The module receptacle is generally cylindrical in shape and is adapted to be snuggly received in the bore 14, the fit being sufficiently tight that the module receptacle 32 is securely held in place once it is inserted. The module receptacle 32 is provided with a horizontally extending slot 35 extending into the front surface thereof as viewed in FIGURE 4, the dimensions being such as to receive the hot wire module 33. The sides of the module receptacle 32 are also slotted and, more particularly, are provided with slots 34 and 36 adapted to receive bifurcated contacts 37 and 38, described in greater detail subsequently. The module receptacle is provided with a central bore 39 in communication at its front end with the slot 35 and at its back end with its external surroundings. The bifurcated contacts 37 and 38 are secured to the vertical walls defined by the slots 34 and 36 and project forwardly therefrom into the region of the slot 35.

The hot wire module comprises a generally rectangular body of electrical insulating material and may be fabricated from the same material as the module receptacle 32. The rectangular body is provided with a horizontal slot 41 in its front vertical surface and a central bore 42 in communication with the slot 41 at one end and adapted to communicate with the bore 39 in the module receptacle 32 when it is inserted therein. Metal contacts 43 and 44 are provided on opposite vertical side surfaces of the module 33 and a hot wire element 46 is disposed in the slot 41 and soldered between the two contacts. The contacts are suitably secured to the body 33 and, when the module is inserted in the module receptacle 32, the contacts 43 and 44 are engaged by the bifurcated contacts 37 and 38.

The assembled anemometer unit and its placement in the punch device; that is, in the bore 14, is illustrated in FIGURE 3. The bores 39 and 42 constitute an extension of passage 15 and direct air flow over the element 46. Lead wires 47 and 48 are secured, as by soldering, to the bifurcated contacts 37 and 38, respectively, and these leads proceed through the bore 15 and through a suitable vacuum seal in the block 3 to external control circuits. The vacuum seal about the leads 47 and 48 is required so as to reduce leakage in the anemometer system and keep out oil.

In operation, whenever the tape is transported, the flow of air relative to the compartment 14, and therefore relative to the hot wire unit 46, is changed. This change in air flow changes the temperature of the unit and therefore its resistance. The unit 46 is connected in a circuit which is capable of detecting this change in resistance and of producing a voltage or current signal indicative thereof. Therefore, this signal indicates a change of air flow in the bore 14 and consequently a change in the position of the tape relative to the bore 20 in the sleeve 19.

As previously indicated, the present invention is also concerned with determining the proper operation of the punch pins 31 in response to an incoming code. Referring again to the FIGURE 2 and further to FIGURE 5 of the accompanying drawings, the punch pins 31 are disposed in vertical bores in a punch pin guide block 49 for vertical reciprocation. The guide block 49 has a horizontally extending recess 51 which extends from the right-hand edge of the block as viewed in FIGURES 2 and 5 into the region of the vertical bores which received the punch pins 31. A stop plate 52 is secured to the under side of the punch pin block 49 and has its left-hand edge disposed in grooves 53 in the lower ends of the punch pins 31. The plate 52 serves to limit downward movement of the punch pins, this function being fully described in the aforesaid U.S. patent. A rectangular-shaped permanent magnet 54 is disposed on the top of the plate 52 and in engagement with the right-hand surface of the block 49. The permanent magnet 54 has a horizontal dimension, parallel to the rear face of the block 49, coextensive therewith so as to provide a magnetic field through a lower portion 56 of the block 49 of substantially uniform intensity.

A plate 57 of magnetically permeable material is disposed in engagement with the upper horizontal surface of the permanent magnet 54 and has a plurality of fingers 58, see FIGURE 6, extending centrally through the channel 51 into the vertical bores in the block 49 which receive the punch pins. The permanent magnet and plate 57 are secured to the stop plate 52 by appropriate means, such as by bolts 61. A coil of wire 60 is disposed about each of the fingers 58 and each is connected to external circuits by means of lead wires 59. The punch pins 31 are each provided with a deep groove 62 disposed opposite its associated finger 58 when the pin is in its downwardmost or unactuated position and is provided with a less deep groove 63 which is adjacent its finger 58 when the punch pin 31 is in its actuated or raised position. This latter condition is indicated by the dashed line 64 in FIGURE 5. The coils and arms 58 are maintained in proper alignment in the recess 51 in the block 49 by imbedding these members, once they are assembled to the plate 37, in a suitable resin, such as an epoxy resin.

The system defined above provides a magnetic path from the permanent magnet 54 through the stop plate 52 and the lower portion 56 of the block 49 into the punch pin 31. The punch pin 31 is always in intimate contact with the guide block 49 and therefore, the reluctance of the path between the portion 56 of the block and the pin is relatively low. Completing the magnetic circuit, when the punch pin is at rest, the magnetic field proceeds through the air gap defined between the end of the finger 58 and the relatively deep recess 62 in the pin and back through the finger 58 and the plate 57 to the permanent magnet 54. When the pin is unactuated, the air gap between the pin 31 and the finger 58 defines a certain reluctance and establishes a predetermined magnetic field pattern linking the turns of the coil 60. Upon actuation of the pin; that is, upward movement thereof to punch a hole, the portion of the pin defined by the less deep recesses 63 is immediately adjacent the arms 58 associated therewith. The spacing between the pin and the arm 58 is now quite small and the reluctance of the magnetic path is materially decreased. This causes the field pattern linking the turns of the coil 60 to be altered and a voltage is induced in the coil of a first polarity. Upon downward movement of the punch pin 31, the field pattern linking the coil 60 reverts to its original configuration and a voltage, of a different polarity from the polarity of the signal originally induced, is generated. Thus, upon each movement of a punch pin, two distinct signals of opposite polarity are produced and these may be readily detected as an indication of the operation of the punch pin. The details of the mechanism for selecting which of the punch pins 31 are to be actuated at any given time are fully described in the aforesaid patent to MacNeill et al. Briefly, this mechanism comprises interposers 45 which are shifted to the left in FIGURE 2, upon actuation of associated electromagnets 50, so that the left ends of the interposers are moved under the lower ends of the punch pins 31. Upon upward movement of a bail 55 due to lateral movement of a cam follower and toggle system 65, the pins 31 having interposers positioned thereunder are moved upward and then downward upon downward movement of the bail 55.

As previously indicated, it is not always sufficient to determine that the proper pattern of punches have been actuated since it may be that the tape did not advance resulting in one code being punched over another code. Therefore, the apparatus previously described for determining the advance of the record member is considered to be necessary to determine fully that the punch has operated completely satisfactorily. Many circuits may be provided for utilizing the combination of two signals verification either to provide a visual or audible indication to an operator or to completely shut down the punch and prevent further operation thereof.

Figure 7:
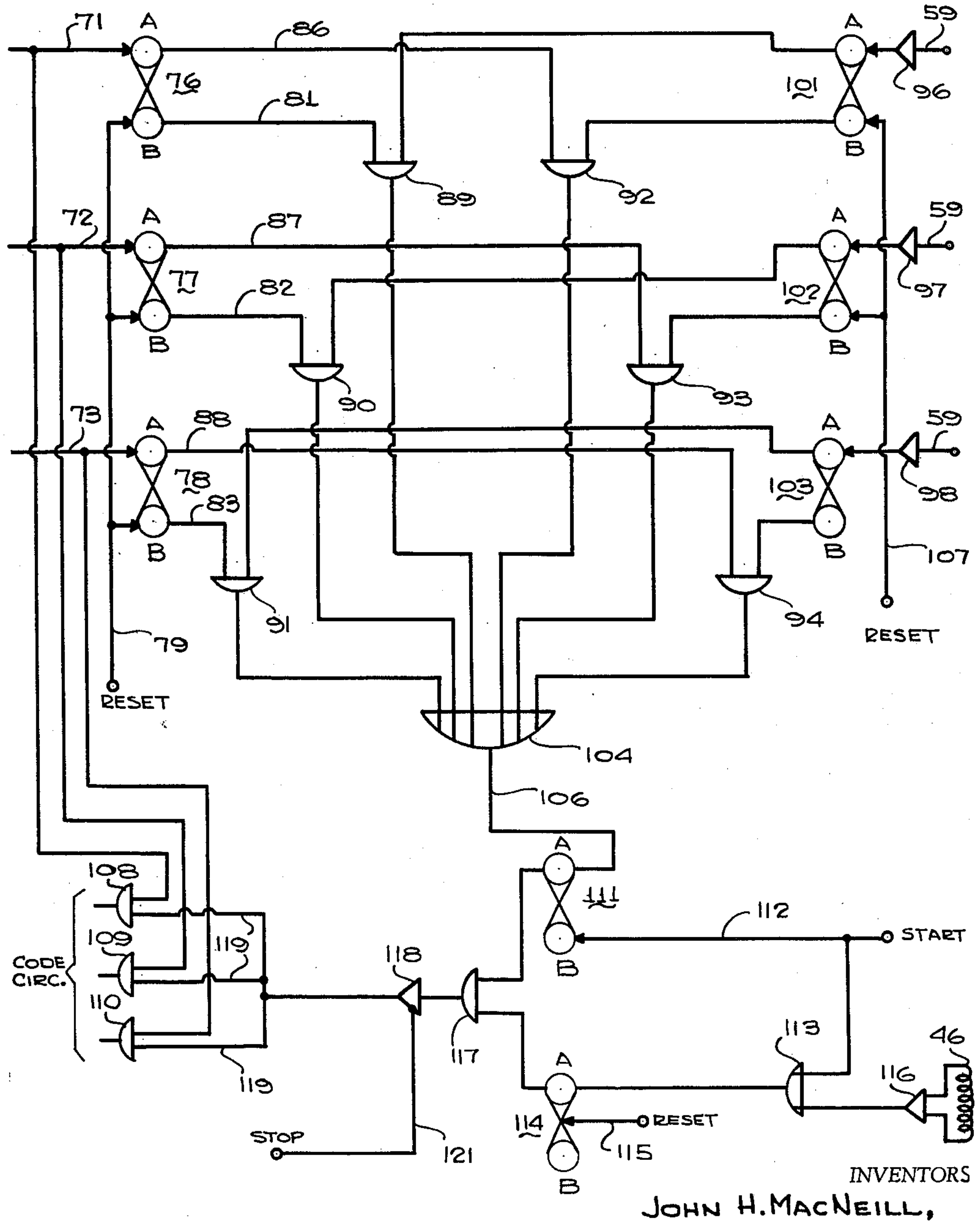
FIGURE 7 is a schematic wiring diagram of the circuitry employed to verify punch pin operation and tape feed.

Referring now specifically to FIGURE 7 of the accompanying drawings, there is illustrated a system for comparing the input code with the code representative of the actual code produced by the punch and employing the results of the comparison and the tape feed signal to control further operations of the punch. The system is limited to a three-level code so as to simplify the drawing. The additional circuits required for more than a three-level code are the same as those illustrated for a three-level code except that the number of elements is compounded. The input signals which are to control the punch operation are applied to input leads 71, 72 and 73. Each of the leads 71, 72 and 73 is applied to the A stage of a different one of a plurality of flip-flops 76, 77 and 78. Start signals are applied to the B stages of the flip-flops 76 through 78 via a lead 79. Upon the initiation of operation of the apparatus, the start signal is applied to the lead 79 and each of the B stages of the flip-flops 76 through 78 are rendered conductive. In consequence, a low voltage is applied to selected ones of output leads 81, 82 and 83 associated with the B stages of the flip-flops 76, 77 and 78, respectively. Complementary signals are applied to output leads 86–88 associated with the A stages of the flip-flops. The leads 81 through 83 are connected to provide one input signal each to a different one of a series of two-input and gates 89, 90 and 91 while leads 86, 87 and 88 are connected to provide one input signal each to a different one of a series of two-input and gates 92, 93 and 94.

The signals derived from the circuits which detect actuation of the punches, the number of such signals being chosen as three to conform to the example chosen above, are applied from leads 59 via distinct amplifiers 96, 97 and 98 to the A stages of flip-flops 101, 102 and 103. An output signal is derived from each of the A stages of the flip-flops 101, 102 and 103 and are applied to the and gates 89, 90 and 91 respectively where the signals are compared with the output signals from the B stages of flip-flops 76, 77 and 78 respectively. An output signal is derived from each of the B stages of flip-flops 101, 102 and 103 and are compared with the output signals from the A stages of flip-flops 76, 77 and 78 in and gates 92, 93 and 94 respectively. The output circuits of all of the gates 89–94 are connected to distinct input leads of an or gate 104 having an output lead 106.

In operation, a start signal is applied to the B stages of flip-flops 76–78 via lead 79 and to the B stages of flip-flops 101–103 via a lead 107, so that all of these stages are conductive. The code to be punched is now applied to the leads 71–73 and is stored in flip-flops 76–78. The code signals are also coupled through and gates 108, 109 and 110 which are conditioned to pass the signals at this moment to the code circuits of the punch and the punch pins are actuated. The signals derived on leads 59 as a result of actuation of the punches are amplified and stored in flip-flops 101–103. If the correct code has been punched then the patterns of active stages in the flip-flops groups 76 to 78 and 101 to 103 are the same. Since the A stages of one group are compared with the B stages of the other group, none of the and gates receives two positive voltages and all of the gates are blocked. If, however, an incorrect pattern of punches is actuated, then at least one flip-flop in the group 101–103 will be in the wrong state of conduction and one of the gates 89–94 will pass a pulse. This pulse is passed through or gate 104 and appears on lead 106. Thus, if the operation of the punch is correct, no pulse appears on lead 106 whereas if the operation of the punch is incorrect a pulse does appear on lead 106.

Continuing with the description of the circuitry illustrated in FIGURE 7, the lead 106 is connected to drive the A stage of a flip-flop 111 while the B stage is driven from a lead 112 to which a start pulse is applied. The start pulse is also applied, via an or gate 113, to the A stage of a flip-flop 114. The feed pulse developed by anemometer 46 is amplified by amplifier 116 and applied to the or gate 113 while the reset pulse is applied to a common input lead 115 of the flip-flop 114. The A stages of flip-flops 111 and 114 are connected to apply output signals to distinct inputs of an and gate 117. The output circuit of the and gate is connected through an amplifier 118 to gating leads 119 of the and gates 108, 109, 110. A reverse-phase output signal is derived from amplifier 118 on a lead 121 which is connected to stop operation of the punch whenever a positive pulse appears thereon.

In considering the operation of the circuits of FIGURE 7, the sequence of operation of the overall system must be considered. Upon initially starting the apparatus, a start pulse appears on leads 79, 107 and 112 while during continued operation a reset pulse appears on leads 79, 107 and 115 at the beginning of each cycle. Each cycle consists of first a punch operation and then a feed operation.

At the initiation of operation, a start pulse resets all flip-flops to their appropriate conditions; flip-flops 76–78 and 101–103 and 111 to the B state and flip-flop 114 to the A state. Immediately thereafter a reset pulse is generated which does not affect any flip-flop except flip-flop 114 which is now set to the B stage of conduction. In consequence, a positive voltage is applied to leads 119. Input pulses are now developed on leads 71–73 and are gated to the punch control circuits via gates 108–110. If operation of the punch is correct, no pulse is developed on lead 106 and the flip-flop 111 remains in the B state of conduction. If a pulse is developed on lead 106, the A stage of flip-flop 111 is rendered conductive blocking the gate 117 and causing a stop voltage to appear on lead 121.

Assuming correct operation of the punch pins, if the feed apparatus operates correctly, a pulse is applied to flip-flop 114 and renders the A stage conductive thereby blocking the gate 117. When the reset pulse is received, the B stage of flip-flop 114 is again rendered conductive and the gate 117 passes a gating voltage to the and gates 108–110 indicating correct operation. If, however, a feed pulse is not generated by amplifier 116, the reset pulse produces conduction of the A stage of flip-flop 114 and the gating voltage is removed from gates 108–110 and a positive voltage appears on the stop lead 121.

It will be noted that in the interval between the occurrence of a feed pulse and a reset pulse, a stop voltage appears on lead 121 even when operation is correct. Therefore this voltage is gated to the stop circuits only at the beginning of a cycle immediately after the reset pulse is produced. A slightly delayed reset pulse may be employed for this purpose. It is apparent that more sophisticated control systems may be employed and, for instance, the gating voltage on the leads 119 may be employed to prevent a further code from being applied to the flip-flops 76 through 78 whenever a malfunction is detected. In this case, the code associated with the prior operation is maintained so that the code actually punched may be compared with the code signal stored in the flip-flops 76 through 78. This comparison may be made either by an individual or by automatic circuits which can control a repunching of the code or an overpunching of the code to indicate that the code is to be ignored, cause the code to be reapplied to the punch, and then cause the punch to continue normal operation.

The anemometer amplifier circuit 145 may be employed but it is preferable to utilize the general type of bridge anemometer circuit as illustrated in copending application Serial No. 780,697 filed December 16, 1958, now Patent No. 3,019,970, in the name of John H. MacNeill for Hot Wire Reader and assigned to the assignee of the present invention.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. A verification system for detecting movement of the punching member of a punching mechanism between its actuated and its unactuated position comprising at least one recess in said punching member, magnetic means for establishing a magnetic flux through said punching member, said magnetic path including an air gap defined at least in part by at least said one recess in said punching member when said punching member is in one of its said positions, and means for detecting variations in the magnetic flux in said magnetic means.

2. A verification system for detecting movement of the punching member of a punching mechanism comprising a guide block having a passage therein, said punching member being disposed in said passage for reciprocation therein between an actuated and an unactuated position, a slot formed in said guide block lying in a plane perpendicular to the axis of said passage and intersecting said passage, a magnetic member disposed in said slot and extending to a point adjacent said passage, said punching member having at least one recess formed therein to provide a relatively large air gap between said punching member and said magnetic member only when said punching member is in one of its two positions, means for establishing a magnetic path extending serially through said guide block, said magnetic member, said punching member and across said air gap and means for detecting variations in the magnetic flux through said magnetic path.

3. The combination according to claim 2 wherein said means for detecting includes an electric coil disposed about said magnetic member.

4. The combination according to claim 2 wherein said punching mechanism includes a plurality of selectively operable punching members each having at least one recess formed therein, said guide block having a plurality of parallel passages therein, said magnetic member comprising a comb-like structure having a plurality of fingers extending through said recess in said guide block, said fingers being equal in number to said punching members and extending to a position adjacent a passage for a different one of said punching members, and said means for detecting including means for independently detecting variations in flux through each of said magnetic members.

5. The combination according to claim 4 wherein said means for independently detecting comprises a plurality of coils each disposed about a different one of said magnetic members.

6. In a punching mechanism having a plurality of punch members, means for operating selectable arrays of said punch members, drive means for incrementally advancing a work member through said punch mechanism, means for producing alternate operation of said means on a one-for-one sequence, a verification apparatus for determining proper operation of a selected array of said punch members and movement of the work member, said verification apparatus comprising means for producing a first signal upon each movement of said work member, means for producing a different signal in response to movement of each of said punch members, means for producing a second signal when the combination of said different signals indicates operation of the proper punch members in accordance with said selectable array of punch members, and means for indicating the presence of both of said first and second signals.

7. The combination according to claim 6 wherein said means for producing said first signal comprises an air flow system for removing the material separated from the work member by the punching members, means for extending the flow of air so as to intersect the work member along a line of equally spaced apertures provided in the work member and means for sensing variations in air flow through the equally spaced apertures as they move past said point of intersection.

8. The combination according to claim 7 wherein said means for sensing includes a thermoelectric device.

9. The combination according to claim 6 wherein said means for producing a different signal in response to movement of each of said punch members comprises a guide block having a plurality of parallel passages therein, there being one passage for each of said punch members, said punching members each being disposed in a different one of said passages for reciprocation therein between an actuated and an unactuated position, a slot formed in said guide block lying in a plane perpendicular to the axes of said passages and intersecting said passages, a comb-like magnetic member having a plurality of fingers, each extending through said recess into a region adjacent a different one of said punch members, each of said punch members having at least two notches of different depths formed therein, means for establishing a magnetic path extending through each of said fingers and thence across the air gaps defined by said notches between said fingers and said punch members and then serially through said punch members and said guide block, and means for detecting variations in magnetic flux in each of said fingers.

10. In a punching mechanism having means for alternately punching and advancing a work member, a verification apparatus comprising first means for producing a different signal in response to movement of each of said punching means, means for producing a further signal when the combination of said different signals indicates operation of a predetermined array of said punching means, means for producing a still further signal upon each advance of the work member, and means responsive to both said further signals for producing an indication of operation of both said punching and advancing means.

11. A verification system for detecting movement of a plurality of punch members of a punching mechanism comprising a guide block having a plurality of parallel passages therein, there being one passage for each of said punch members, said punching members each being disposed in a different one of said passages for reciprocation therein between an actuated and an unactuated position, a slot formed in said guide block lying in a plane perpendicular to the axes of said passages and intersecting said passages, a comb-like magnetic member having a plurality of fingers, each extending through said recess into a region adjacent a different one of said punch members, each of said punch members having at least two notches of different depths formed therein, means for establishing a magnetic path extending through each of said fingers and thence across the air gaps defined by said notches between said fingers and said punch members and then serially through said punch members and said guide block, and means for independently detecting variations in magnetic flux in each of said fingers.

References Cited in the file of this patent

UNITED STATES PATENTS

| | | |
|---|---|---|
| 2,206,218 | Blakely et al. | July 2, 1940 |

| | | |
|---|---|---|
| 2,484,111 | Mills | Oct. 11, 1949 |
| 2,604,944 | Kelly | July 29, 1952 |
| 2,609,433 | Goff | Sept. 2, 1952 |
| 2,832,412 | Bellinger et al. | Apr. 29, 1958 |
| 2,962,208 | MacNeill et al. | Nov. 29, 1960 |
| 2,980,320 | La Pointe | Apr. 18, 1961 |

OTHER REFERENCES

IBM Technical Disclosure Bulletin, vol. 3, No. 3, August 1960.